United States Patent [19]

Patterson

[11] Patent Number: 4,803,044
[45] Date of Patent: Feb. 7, 1989

[54] BWR ASSEMBLY
[75] Inventor: John F. Patterson, Richland, Wash.
[73] Assignee: Advanced Nuclear Fuels Corporation, Richland, Wash.
[21] Appl. No.: 116,606
[22] Filed: Nov. 3, 1987

Related U.S. Application Data

[63] Continuation-in-part of Ser. No. 850,104, Apr. 10, 1986, Pat. No. 4,708,846.

[51] Int. Cl.$^4$ .............................................. G21C 3/32
[52] U.S. Cl. .................................... 376/444; 376/435; 376/443
[58] Field of Search .................. 376/444, 435, 443

[56] References Cited

U.S. PATENT DOCUMENTS

| | | | |
|---|---|---|---|
| 3,526,745 | 9/1970 | Nylund et al. | 376/444 |
| 3,802,995 | 4/1974 | Fritz et al. | 176/76 |
| 4,314,884 | 2/1982 | Fanning et al. | 376/441 |
| 4,420,458 | 12/1983 | Dunlap et al. | 376/447 |
| 4,478,786 | 10/1984 | Andersson et al. | 376/444 |
| 4,514,358 | 4/1985 | Borrman et al. | 376/362 |
| 4,526,746 | 7/1985 | Fredin | 376/444 |
| 4,708,846 | 11/1987 | Patterson et al. | 376/444 |
| 4,749,547 | 6/1988 | Blomstrand | 376/444 |
| 4,759,912 | 7/1988 | Taleyarlehan | 376/444 |

Primary Examiner—Donald P. Walsh
Attorney, Agent, or Firm—Volker R. Ulbrich; Robert Keith Sharp

[57] ABSTRACT

A fuel assembly for boiling water reactors includes, in addition to the usual outer flow channel which surrounds the fuel rods, an inner flow channel having rectilinear sides disposed within the fuel assembly, extending vertically therethrough, and arranged to receive cooling water at or below the bottom of the assembly. The channel is of such size as to span several cooling rods in each direction. A closure is provided in the channel within the critical heat flux zone of the assembly. At least one inner tube extends through the closure. The channel is closed at its upper end, and the inner tube is open at its upper end, which is located near the upper end of the channel. Egress openings are provided in the walls of the channel just above the closure. These openings are so positioned relative to the fuel tubes that jets of water emitted from them do not impinge directly on the fuel tubes, but rather enter the flow spaces between them. Other egress openings are provided in the walls of the channel below the closure.

7 Claims, 2 Drawing Sheets

BWR ASSEMBLY

This application is a continuation in part of application Ser. No. 850,104 filed April 10, 1986, issued 11/24/87 as U.S. Pat. No. 4,708,846.

The above application discloses a fuel assembly for boiling water nuclear reactors (BWR). It is characterized by a "water rod," i.e. a tube extending vertically through the fuel assembly parallel to the fuel rods. It is open at its lower end to receive cooling and moderating water, but is closed at its upper end. A plurality of holes are formed in the tube to permit egress of water. An inner tube, open at its upper and lower ends, is arranged concentrically in the water tube. The annulus formed by the inner tube and the water tube is closed at the lower end of the former.

Openings are provided in the water tube above its juncture with the inner tube. These holes are located in the critical heat flux zone of the assembly. There are also openings below this juncture, some of which are located at the lower end of the critical heat flux zone. There may also be other openings farther down the tube. In operation, water enters the lower end of the water tube and flows upwardly through it. This adds moderation to the assembly and improves its performance, and introduction of water into and just below the critical heat flux zone improves the cooling and permits operation of the assembly at higher power.

The desirability of a flow of non-boiling water through portions of the assembly has been recognized for some time as desirable, and arrangements other than the typical "water rods" have been designed for this purpose. The object of this invention is to obtain in these alternate designs the advantages which are secured by the design of the above-identified application.

SUMMARY OF THE INVENTION

According to this invention, an inner flow channel having rectilinear sides is disposed within the fuel assembly, extending vertically therethrough and arranged to receive cooling water at or below the bottom of the assembly. The channel is of such a size as to span several cooling rods in each direction. A closure is provided in the channel within of the critical heat flux zone of the assembly. At least one inner tube extends through the closure. The channel is closed at its upper end, and the inner tube is open at its upper end, which is located near the upper end of the channel. Egress openings are provided in the walls of the channel just above the closure. These openings are so positioned relative to the fuel tubes that the jets of water emitted from them do not impinge directly on the fuel tubes, but rather enter the flow spaces between them.

In one embodiment, the channel is a flat sided, box-like structure, positioned centrally of the assembly. In another, it is of cruciform shape. Still other arrangements are possible, such as narrow rectangular boxes extending inwardly from the walls of the outer flow channel which forms the boundary of the assembly.

DETAILED DESCRIPTION

Figure 1:
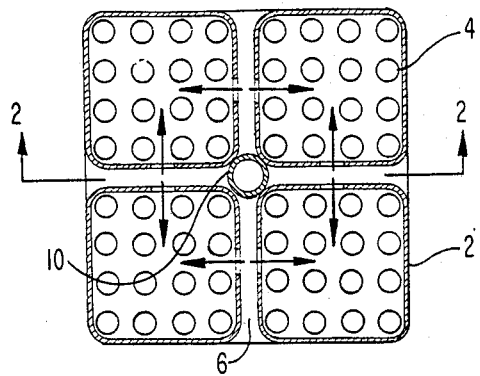
FIG. 1 is a cross section through the upper portion of the assembly taken on the line 1—1 of FIG. 2.

In describing my invention, reference will be made to the above application, Ser. No. 850,104, now U.S. Pat. No. 4,708,846. A fuel assembly for a boiling water reactor of the type to which this inention applies is shown in FIG. 1 of that patent. Like the assembly shown in that figure, the embodiment of this invention illustrated in FIG. 1 and 2 includes an outer flow channel 2, and a plurality of parallel vertical fuel rods 4. Within this outer flow channel is an inner flow channel 6 which, as best shown in FIG. 1, is cruciform in section, with its ends at approximately the mid points of the sides of outer flow channel 2.

Figure 2:
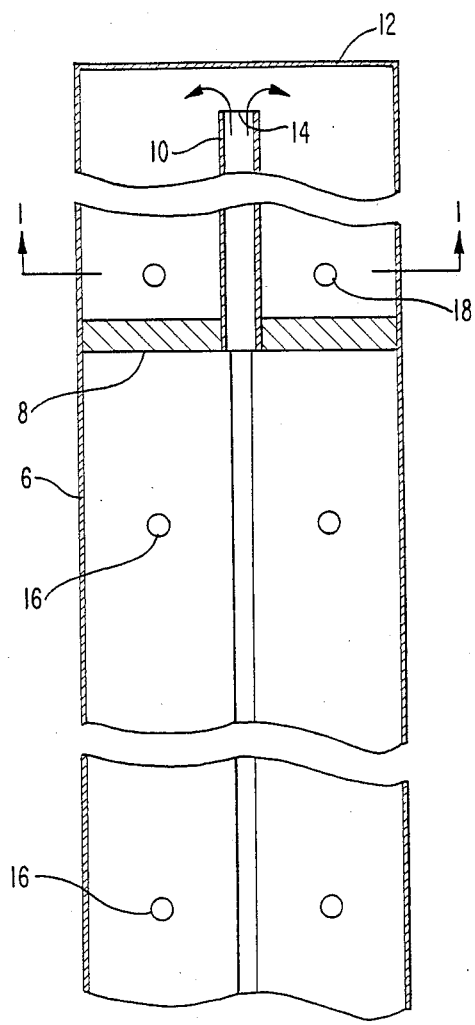
FIG. 2 is a vertical section through the assembly taken on the line 2—2 of FIG. 1.
Figure 3:
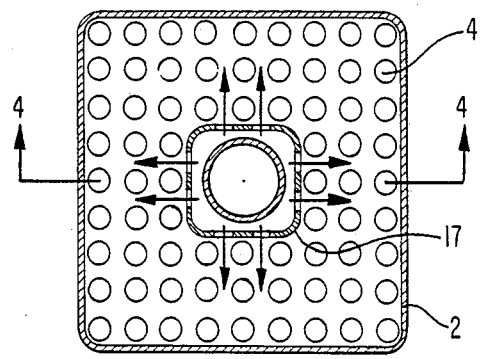
FIG. 3 is a horizontal section through the upper portion of another embodiment of the invention taken on the line 3—3 of FIG. 4.
Figure 4:
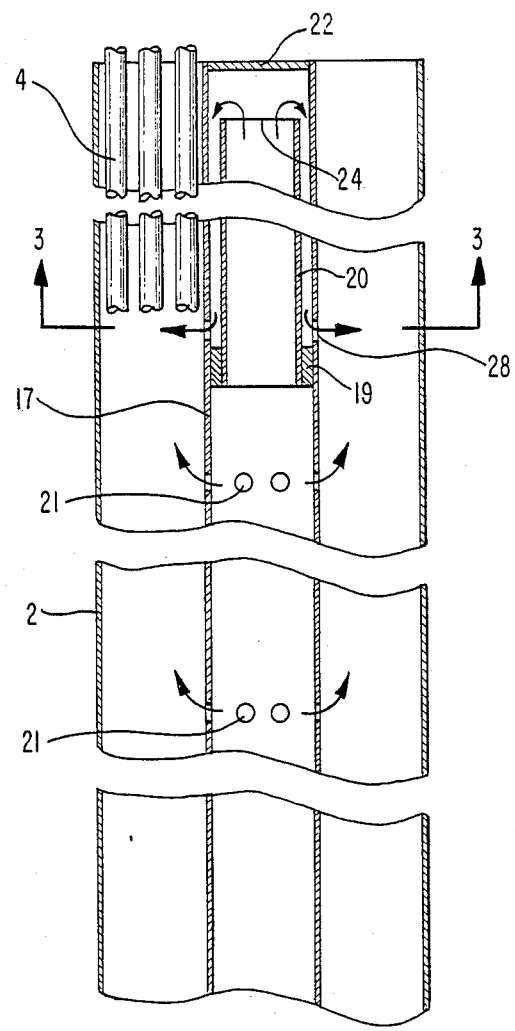
FIG. 4 is a vertical section of the embodiment of FIG. 3 taken on the line 4—4 of FIG. 3.

Like the water tubes of the above mentioned patent, inner flow channel 6 will either be provided with openings for inlet of water slightly above the lower tieplate of the assembly, or it may extend below that tieplate, as shown in FIGS. 2 and 4 respectively of that patent. In the upper portion of the inner flow channel 6 is a closure 8, through which extends an inner tube 10. The upper end of the inner flow channel 6 is closed at 12 while the upper end of the inner tube 10 is open as shown at 14. Alternatively, the inner tube 10 may be closed at its upper end, and provided with egress openings, such as shown in FIGS. 2 through 5 of the above patent. The inner channel 6 is provided with intermediate egress openings 16, positioned below the closure 8, near the lower end of the critical heat flux zone of the assembly. It is also provided with upper egress openings 18, positioned above the closure 8 within the critical heat flux zone. The intermediate openings 16 will normally be positioned in the range of about 50 percent to 65 percent of the height of the assembly measured from the bottom, and the upper openings 18 will be distributed in the range of about 65 percent to 75 percent of the height. The two sets of openings may be spaced a substantial distance apart, e.g. 10 percent of the height of the assembly, although openings uniformly distributed along the upper half of the assembly could also yield satisfactory results.

In operation, cooling water will enter the inner channel 6, at or near the bottom of the assembly, and flow upwardly therethrough. The greater proportion of the water, e.g. about two-thirds, will exit through openings 16. The remainder, e.g. one-third, will enter the inner tube 10 and flow upwardly through it, downwardly within inner channel 6, and out through openings 18, where it will enter the critical heat flux zone. The openings 16 and 18 are so sized that the entire inner channel 6 is maintained full of water at all times, thereby increasing the moderation of the assembly at the same time the flow outwardly through openings 16 and 18 supplies coolant to the critical heat flux zone, where it is most needed. This has been found to materially increase the power that can be generated by an assembly containing a given amount of fuel.

While I have shown only one inner tube 10, it is obvious that there be others, of the same form, positioned in the arms of cruciform inner channel 6.

Moreover, the centraltube could be omitted and all the inner tubes located in the arms.

In FIGS. 3 and 4 I have shown an alternate embodiment of my invention. In this embodiment the assembly is provided with a centrally positioned inner channel 17 of square cross section. This inner channel is provided with a closure 19, through which extends an inner tube 20. The inner channel 17 is closed at its upper end 22 while the inner tube 20 is open at its upper end 24. Once again, the inner tube may be closed at its upper end, e.g., by being joined to the closed upper end 22 of channel 17, and provided with egress openings near or at the top. The inner channel 17 is provided with openings 26, and the inner tube 20 with openings 28, which correspond in their position and function to openings 16 and 18, respectively, in the embodiment of FIGS. 1 and 2.

As shown in FIGS. 1 and 3, the openings 16, 18, 26, and 28 are so positioned that they do not impinge directly on a fuel rod, but rather direct the jet streams into the spaces between the rods. This avoids inducing vibration in the fuel rods, which may result in fretting at their points of support.

While I have shown and described two embodiments in detail, it will be obvious to those skilled in the art that various changes can be made. I therefore wish my invention to be limited solely by the scope of the appended claims.

What is claimed is:

1. A fuel assembly for a boiling water reactor comprising a group of vertical, parallel, elongated fuel rods containing a fissionable material, and an outer flow channel surrounding said fuel rods, said assembly having a critical heat transfer zone in its upper portion; at least one inner flow channel having substantially rectilinear sides spanning at least several fuel tubes, said inner channel being constructed and arranged to receive cooling water near the lower end of said assembly, said inner channel extending upwardly through said assembly parallel to said fuel rods and closed at its upper end; a closure in the upper portion of said inner channel; an inner tube having an opening through said closure, and an opening adjacent to the top of said inner channel; at least one opening in said central tube, adjacent said closure, and upper openings in said inner channel above said closure, and located within said critical heat flux zone, whereby cooling water will flow upwardly through said inner channel, upwardly through said inner tube, then downwardly through said inner channel and outwardly through said upper openings into the critical heat flux zone.

2. An assembly as defined and claim 1, and further including at least one intermediate egress opening in said inner channel adjacent to the lower end of said critical heat transfer zone.

3. An assembly as defined in claim 2, wherein said intermediate egress opening is located in the range of about 50 percent to about 65 percent of the height of the assembly measured from the bottom.

4. An assembly as defined in claim 3, wherein said upper exit opening is located in the range of about 65 percent to about 75 percent of the height of the assembly measured from the bottom, said intermediate and upper opening being spaced a substantial distance apart.

5. An assembly as defined in claim 1, wherein said inner channel is cruciform in shape with its arms extending from side to side of said fuel assembly, at about the midpoint of the sides thereof.

6. An assembly as defined in claim 5, wherein said inner tube is located at the crossing point of the arms of said cruciform flow channel.

7. An assembly as defined in claim 1, wherein said inner flow channel is a substantially rectangular member centrally positioned in said fuel assembly.

* * * * *